June 13, 1939.  M. E. SUTTON  2,162,448
STUMP PULLER
Filed Dec. 2, 1938   2 Sheets-Sheet 2

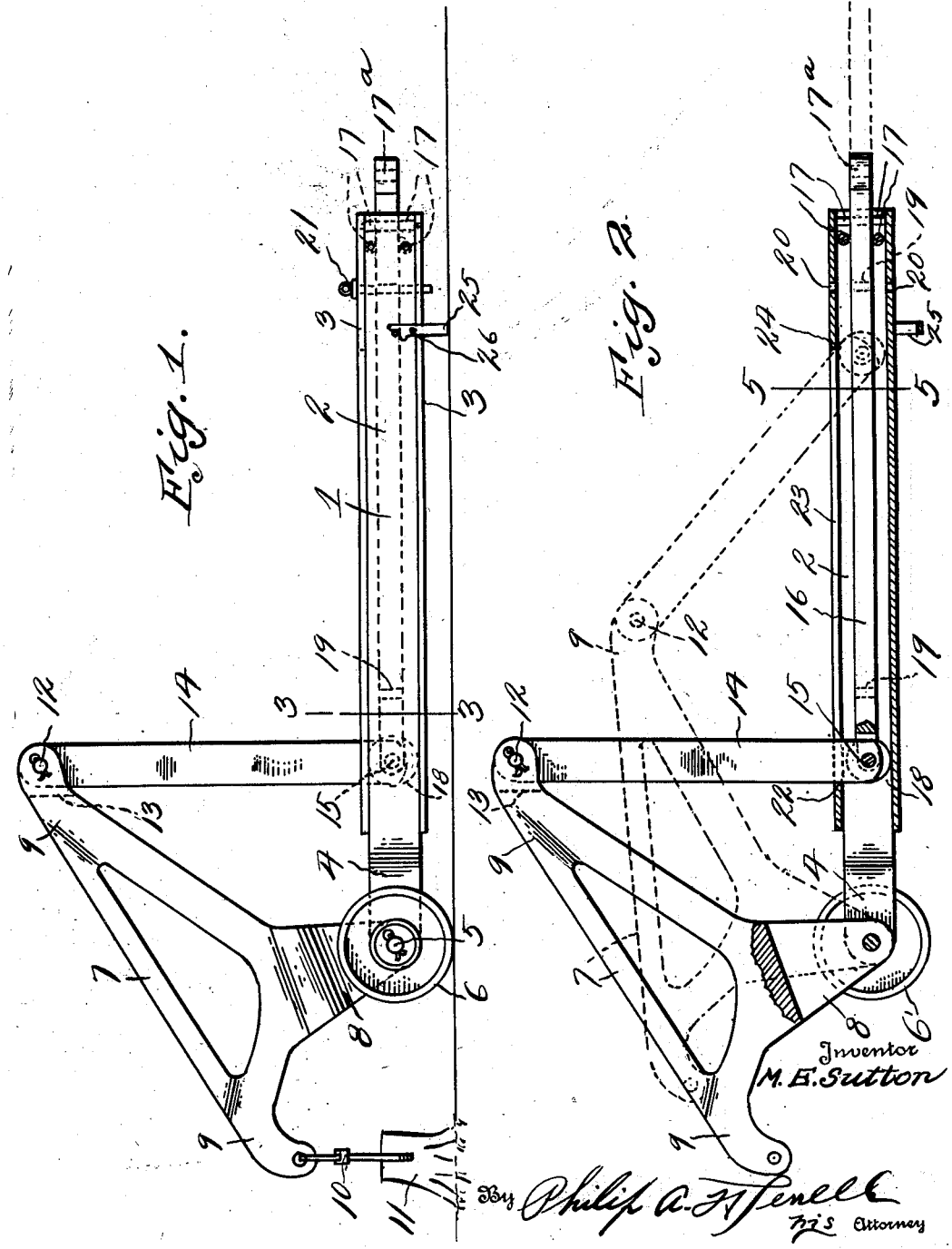

Inventor
M. E. Sutton
By Philip A. Ferrell
Attorney

Patented June 13, 1939

2,162,448

UNITED STATES PATENT OFFICE 2,162,448

STUMP PULLER

Marion E. Sutton, Jacksonville, Fla.

Application December 2, 1938, Serial No. 243,668

6 Claims. (Cl. 254—8)

The invention relates to stump pullers, and has for its object to provide a device of this character which may be easily and quickly attached to a stump, and provided with means to which a truck may be attached for operating the stump pulling mechanism and for conveying the stump puller and stump carried thereby to a point of discharge.

A further object is to provide a stump puller of the single lever type comprising a wheel supported frame having a T-shaped rock lever with one of its arms pivotally mounted on the frame and its other arms extending in opposite directions, and one of which is adapted to be attached to a stump and a link connection between the other arm and a slidable bar mounted in the frame.

A further object is to provide antifrictional bearings within the frame for the inner end of the operating bar and antifrictional bearings at the rear end of the frame and between which the operating bar is guided as it is reciprocated inwardly or outwardly.

A further object is to provide the upper side of the frame with a slot through which the link connection extends and to position the ends of the slots for limiting the forward and rearward movement of the link. Also to provide spaced apertures in the operating bar adapted to register with apertures in the frame for the reception of a pin for holding the device in inoperative position when it is being transported from place to place, and for holding the operating bar against inward movement during a stump transporting operation.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a side elevation of the stump puller.

Figure 2 is a vertical longitudinal sectional view through the stump puller showing the operative position of the parts in dotted lines.

Figure 4:
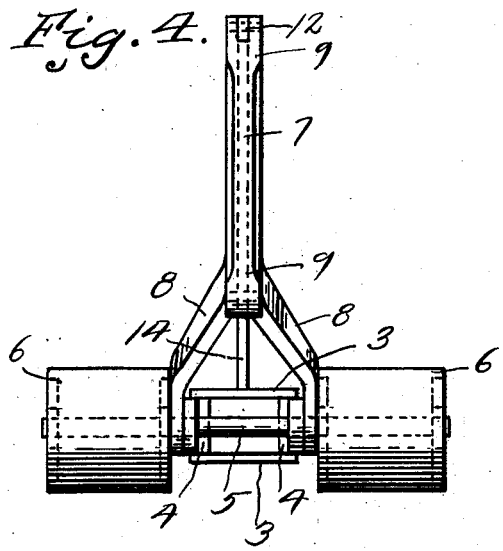
Figure 4 is a front elevation of the stump puller.
Figure 3:
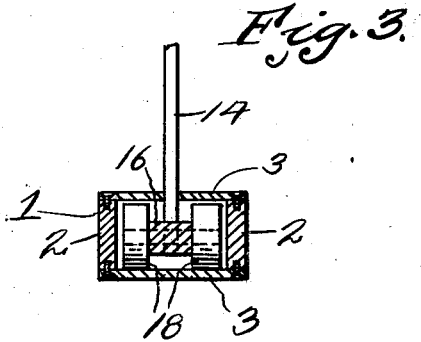
Figure 3 is a vertical transverse sectional view taken on line 3—3 of Figure 1.
Figure 5:
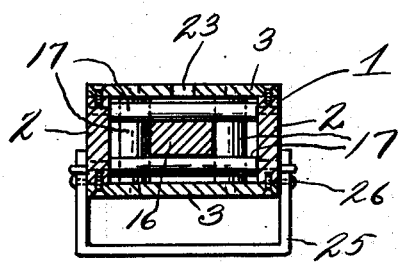
Figure 5 is a vertical transverse sectional view taken on line 5—5 of Figure 2.

Referring to the drawings, the numeral 1 designates the elongated body of the puller, which body comprises spaced parallel bars 2 connected together by plates 3 to form a rigid structure. The forward ends 4 of the bars 2 diverge outwardly and are pivotally mounted on the axle 5 between the ground engaging wheels 6. Rockably mounted on the axle 5 is a single throw lever 7, which lever is T-shaped in form. The spaced arms 8 of the lever 7 extend downwardly and outwardly and are rockably mounted on the axle 5. The other arms 9 of the lever are in alinement, and one is provided with a stump grapple 10 for gripping the stump 11 during a pulling operation. Although a grapple is described, it is to be understood any kind of attaching means may be used. Pivotally mounted at 12 in a bifurcation 13 of the rear arm 9 is a downwardly extending link 14, the lower end of which is pivotally mounted on a transverse shaft 15 within the body 1. Also pivotally mounted on the shaft 15 is the operating bar 16, which extends rearwardly and is guided between antifrictional bearings 17, engaging all the sides thereof. Bar 16 terminates in an eye 17ª, to which a truck may be attached for pulling the bar rearwardly during a stump pulling operation. Mounted on the shaft 15 within the body 1, at opposite sides of the link 14 are antifrictional bearings 18, which cooperate with the inner surfaces of the plates 3 for positively guiding the operating bar in its movement and reducing the friction, thereby increasing the power applied during the stump pulling operation.

The bar 16 is provided with apertures 19 adapted to register with apertures 20 in the plates 3 for the reception of a pin 21 upon the extreme movements of the operating bar, thereby preventing inward or outward movement of the bar 16 during a transporting of the device with or without a stump.

It will be noted that the link 14, when in inoperative position, shown in Figures 1 and 2, is in vertical position and limited in its forward movement by engagement with the end 22 of the elongated slot 23 in the upper plate 3. It will also be noted, by referring to the dotted line position shown in Figure 2, the link is limited in its rearward movement by engagement with the end 24 of the slot, and at which time the forward aperture 19 will register with the apertures 20 for the reception of the pin 21. In this position the puller is being transported to a point of discharge of the stump, consequently the bar 16 is held against inward movement.

It will be noted that the arms 8 of the rock lever are at an acute angle to the forwardly extending arm 9, therefore it will be seen that the leverage will be increased during a rocking operation, and the greatest leverage is on the rear end or arm 9. It will also be noted that by positioning the link 14 vertically the initial movement of the lower end thereof rearwardly will impart a slow starting pull, increasing in speed as the bar 16 moves rearwardly for a quick pulling after the initial breaking of the stump within the ground.

From the above it will be seen that a stump puller is provided which is simple in construction, the parts reduced to a minimum, and one wherein the stump pulling and transporting operation may be a continuous one. The body 1 is provided with a U-shaped supporting leg 25, pivotally mounted at 26 to opposite sides thereof, for supporting the body spaced from the ground, and being pivotally mounted may be folded upwardly out of position when the device is being moved from place to place.

The invention having been set forth what is claimed as new and useful is:

1. A stump puller comprising an elongated body member, wheels supporting the forward end of said body member, a rockable T-shaped lever mounted on the body member adjacent the forward end thereof, a longitudinally movable operating bar carried by the body member, a link connection between one of the arms of the T-shaped lever and the operating bar and means whereby one of the arms of the T-shaped lever may be attached to a stump.

2. A stump puller comprising an elongated body member, an axle carried at the forward end of said body member, supporting wheels carried by said axle, a rockable T-shaped lever having one of its arms pivotally mounted on the axle, the other arms of said lever extending in opposite directions, one of said last-named arms having means for receiving a stump attaching means, the other of said last named arms having pivotally connected thereto a downwardly extending link, a slidable operating bar within the body, the lower end of said link being connected to said bar, and antifrictional bearings within the body and cooperating with the longitudinally movable operating bar.

3. A device as set forth in claim 2 wherein the antifrictional means for the operating bar comprises spaced bearings on the opposite sides of the connection between the link and operating bar and spaced bearing rollers horizontally and vertically positioned at the rear end of the body within the body and between which the operating bar extends.

4. A device as set forth in claim 2 wherein the operating bar is entirely housed within the body, the upper side of said body being provided with an elongated slot through which the link extends, said link being limited in its forward and rear positions by engagement with the ends of the slot.

5. A device as set forth in claim 2 including spaced apertures carried by the operating bar and adapted to register with pin receiving apertures in the body upon extreme movements of the bar.

6. A device as set forth in claim 2 wherein the link extends through a slot in the body and is limited in its extreme movements by the ends of said slot and spaced apertures carried by the bar and positioned to register with a pin receiving aperture in the body upon extreme movements of the bar and link.

MARION E. SUTTON.